Oct. 10, 1933.  L. C. HUCK  1,930,272
FLEXIBLE BRAKE OPERATING MEANS
Filed April 13, 1931   2 Sheets-Sheet 1

Inventor
Louis C. Huck
By Blackmore, Spencer & Fiut
Attorneys

Oct. 10, 1933.   L. C. HUCK   1,930,272
FLEXIBLE BRAKE OPERATING MEANS
Filed April 13, 1931   2 Sheets-Sheet 2
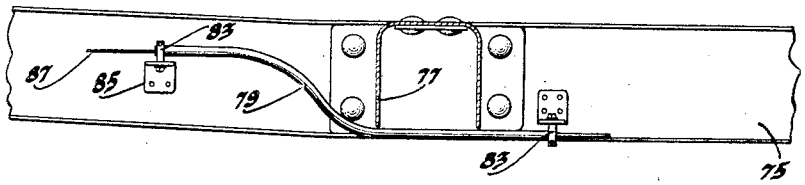
Fig. 8
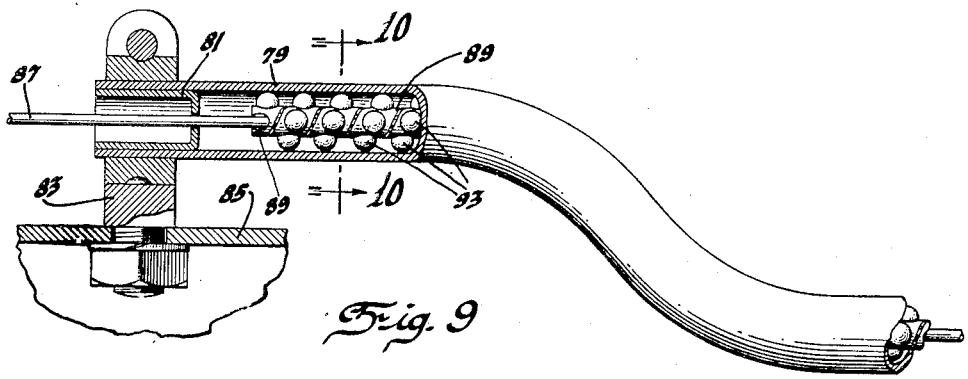
Fig. 9
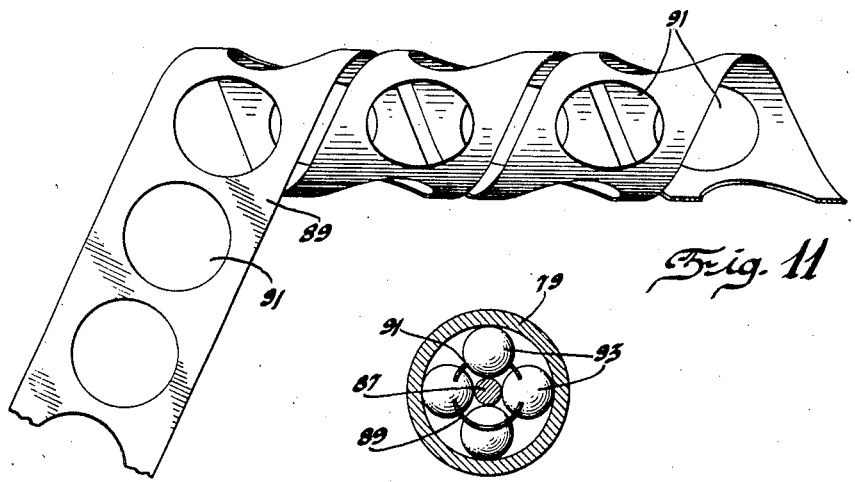
Fig. 11
Fig. 10
Inventor
Louis C. Huck Patented Oct. 10, 1933

1,930,272

UNITED STATES PATENT OFFICE 1,930,272

FLEXIBLE BRAKE OPERATING MEANS

Louis C. Huck, Grosse Pointe Village, Mich.

Application April 13, 1931. Serial No. 529,879

5 Claims. (Cl. 74—39)

This invention relates to a flexible operating means for brakes or other mechanisms controlled from a distant point. It has been designed more particularly for use in connection with brakes on the dirigible wheels of vehicles.

An object of the invention is to provide an operating means which avoids the tendency of the operating element or cable to reciprocate within its housing under the influence of the steering movement of the vehicle wheels.

Another object is to reduce to a minimum the friction between the element or cable and its housing when reciprocation of the cable within the housing occurs as in the act of applying the brakes.

Other objects and advantages will be understood from the following description.

In the drawings accompanying this description Fig. 1 is a view in side elevation of a portion of a vehicle chassis showing my flexible brake-operating mechanism associated therewith.

Fig. 8 shows in elevation a modified form making use of an inflexible cable housing.

Fig. 9 is a view in horizontal section of the cable and housing shown in Fig. 8, this view being on an enlarged scale.

Fig. 10 is a section on line 10—10 of Fig. 9.

Fig. 11 is a view in elevation of the retainer for the anti-friction means used with the form of the invention shown in Fig. 9.

Figure 1:
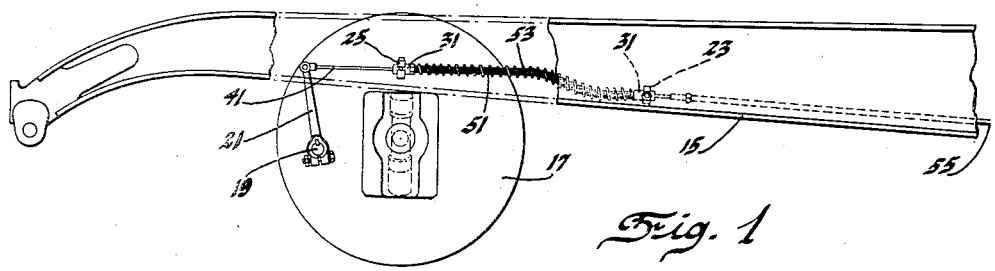
Figure 2:
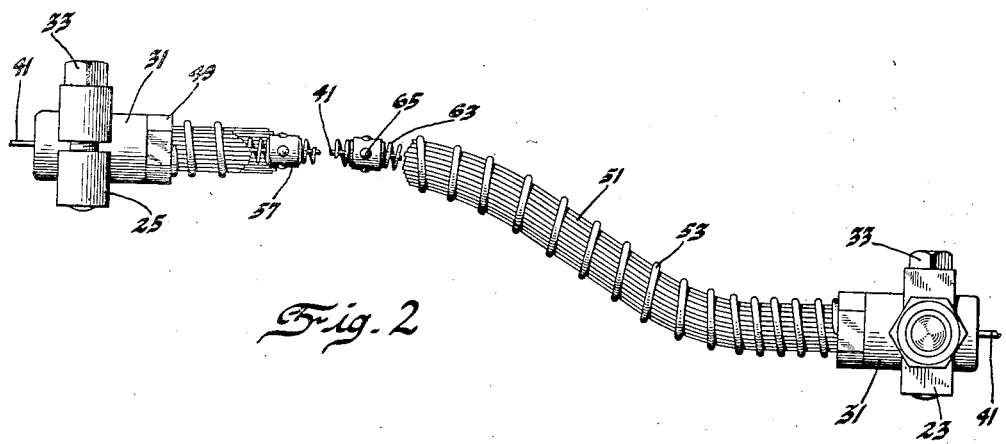
Fig. 2 is a view of the cable in elevation, partly broken away and in section.

On Fig. 1 numeral 15 is a side frame member of a vehicle chassis and 17 is the fixed or backing plate which is associated with the steering knuckle of a road wheel and is turned with the wheel in steering movements. A brake-operating shaft 19 is rotatably supported in plate 17 and is provided with a lever arm 21. Between the plate 17 and the cooperating brake drum carried by the wheel there will be employed a cam or any preferred kind of operating means. This operating mechanism within the drum is not shown as it forms no part of the invention.

Figures 3, 4, 5:
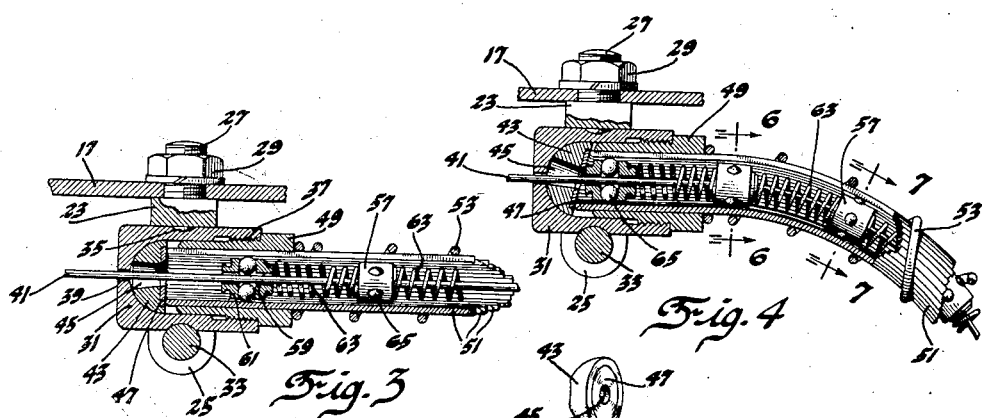
Fig. 3 is a view in horizontal section at one end of the cable.
Fig. 4 is a similar sectional view with the parts in changed relation.
Fig. 5 is a perspective of a detail.

A split clamping member 23 having furcations 25 is formed with a threaded stud 27 which is extended through the plate 17 and held in position by a nut 29. A terminal element 31 cylindrical in form is secured in the clamp 23 by fastening means 33 which draws the furcations together, the fastening means 33 locating the terminal element 31 by means of a circumferential groove 35 in the terminal element which receives the fastening means 33. The terminal element is bored out as shown and terminally threaded as at 37. The bottom of the bored out recess in the terminal element is spherical in form as shown in Fig. 3, and an aperture 39 is formed therein for the passage of a flexible operating element or cable 41. Seated against the spherical surface at the bottom of the recess in terminal element 31 is a spherical disc 43. This disc has a flared opening 45 as shown. This disc has a thrust ring 47 in a recess therein as shown. A thimble 49 is threaded into the terminal element and within this thimble is the end of the cable housing.

Figures 6, 7:
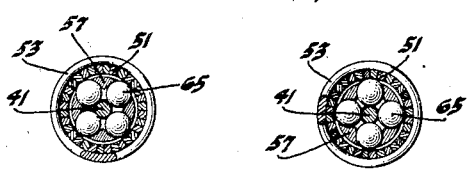
Fig. 6 is a transverse section on line 6—6 of Fig. 4.
Fig. 7 is a transverse section on line 7—7 of Fig. 4.

The cable housing may be said to be of the keystone type. It may be formed by arranging a series of rods 51 of equal length to form a tube circular in cross section. Each rod is itself substantially trapezoidal in section as shown in Fig. 6 and Fig. 7. The rods are bound together by a surrounding spring wire 53 spirally wound. The rods are, however, intended to slide relative to each other longitudinally and also to slide in the end thimble 49. The ends of the rods engage the thrust ring 47. The other end of the flexible housing is secured to the frame member 15 by a substantially similar attaching device including the equivalent of the terminal member 31 and the attaching means 23.

Extending through the cable housing is the flexible element or cable 41. At each end the cable extends beyond the terminal element 31. At one end it is secured to lever 21. At its other end it is secured to an operating rod or cable 55 which is to be reciprocated by any suitable connection with a manually operable member not shown. The cable extends through the housing substantially along its neutral axis. Within the cable housing are a plurality of ball carriers 57. Each has an axial opening 59 extending therethrough for the passage of the cable 41. At its ends each ball carrier 57 is reduced in dimension and has an external groove 61. Between adjacent carriers are coil springs 63, the end coils being seated in the grooves of the carriers. The ball carriers are thus held in spaced relation. They are free to move toward or away from each other by the resilient action of the springs 63. The carriers may also assume angular relations relative to each other by the free bending movements of the spring which occur when the flexible cable is bent. The total length of the inner assembly between the end ball carriers is somewhat less than the length of the rods making up the cable housing. Each carrier is bored out diametrically, preferably two such apertures being formed to permit the assembly of four anti-friction balls 65. The two balls in each opening are held from escaping by peening over the outer edges of the opening after assembly. The balls engage the inner periphery of the cable housing and also the cable itself passing through the axial opening 59.

When the cable is actuated to apply the brake, it is moved along the neutral axis of the housing, as will be obvious and the point contact between the balls and the cable and housing wall causes the assembly of carriers and springs to move substantially without friction within the housing. It is to prevent sliding of the cable relative to fixedly positioned balls that the inner assembly of the ball carriers is made of less length than the length of the housing as stated above. In the event that the axial movement of the cable in applying the brake is greater than enough to bring the end carrier into engagement with its adjacent thrust ring there will be some little sliding of the cable against fixedly positioned balls. On the subsequent release movement, the carrier assembly will be moved further from its end abutment than before so that in practice there is in effect a true anti-friction contact between the cable and the housing throughout the range of relative movement.

One of the difficulties encountered in flexible cables housed in flexible conduits anchored at their ends has been the creeping movement of the cable longitudinally of its housing when the latter is bent by the movement of the wheels in steering. This may result in cable movements sufficient to take up the clearance at one of the steering wheel brakes and applying that brake. This creeping is due to the fact that when such a cable is bent its diametrically opposite walls are bent on unequally long radii. If the wall corresponding to the smaller radius could occupy a greater arc and the wall on the outer radius a correspondingly less arc, the neutral axis of the cable would be unchanged and no movement of the cable relative to its housing would occur as a result of such bending of the housing. Just that result is accomplished by a housing made of relatively slidable longitudinal rods of equal length as herein described where the ends of the rods engage the thrust rings which are mounted to rock to accommodate the movements of the rods. Normally when the cable is unbent the ends of the several rods engage the rings such that the rings are at right angles to the straight line of the cable. When the cable is bent the discs assume changed positions to accord with the unequal center angles for the inner and outer walls, these angles being unequal owing to the fact that the outer and inner rods are equal in length but are applied to the circumferences of circles having unequal radii. The neutral axis is then substantially unchanged since the extremity of a rod on the outer arc has been moved equally but in an opposite direction from the extremity of a rod on the inner arc. This will be apparent from a comparison of the position of the parts in Fig. 3 and in Fig. 4.

With the cable and housing as described there is no danger that steering movement may take up the brake clearance and apply the brake. Friction between the cable and its housing is reduced to a minimum.

In Figs. 8 to 11 there is shown a form of the invention intended for use when a brake-applying means must operate on a path other than a straight line, and wherein a rigid housing may be used together with a flexible cable. In Fig. 8 numeral 75 represents a longitudinal member of the vehicle frame and 77 a cross member. In this case it may be assumed that it is necessary to extend an operating cable from a point on frame member 75 adjacent the top of member 77 to another point on member 75 near the bottom of member 77. To that end instead of using rods and bell crank levers with joints subject to wear and noise, there is shown a bent tube 79 which is rigid and inflexible. Within each end of tube 79 is an apertured cap 81. Clamps 83 corresponding to the clamps shown in Fig. 3 are used to secure the ends of tube 79 to anchor plates 85 secured to the frame member 75. The flexible cable 87 extends through the neutral axis of tube 79. A strip of sheet metal 89 is apertured as at 91 throughout its length and the strip is rolled into spiral form over the flexible cable as will be understood by reference to Figs. 9 and 11. As the cable and the strip 89 are fed into the tube 79 balls 93 are inserted into the openings 91, so that the balls may engage the cable 87 and also the inner wall of the housing 79. The openings 91 are of somewhat less diameter than the diameter of the balls. The length of the strip 89 is somewhat less than the linear distance between the two members 81, so that unrestricted movement of the flexible cable takes place as it moves longitudinally within the tube 79.

It will be obvious that the anti-friction means of Fig. 4 may be used if desired in the rigid tube 79 in place of that form shown in Fig. 9. Also, if so desired, the spiral ball retainer of Fig. 9 might be used in connection with the keystone type of flexible housing.

I claim:

1. A flexible housing for a flexible cable, said housing comprising a plurality of rods each trapezoidal in section, said rods arranged in circular formation and each rod slidably engaging adjacent rods together with fixed terminal members, said rods slidably mounted therein, thrust rings rotatably mounted in said terminal members and having flat surfaces engaging the ends of said rods.

2. In combination, a housing for a flexible cable, a flexible cable reciprocable therein, terminal members receiving the ends of said housing, means within said housing having spaced parts providing anti-friction engagement with said housing and cable, said means including connections between said parts whereby said parts may assume a plurality of angular relations, said means being of less length than the length of said housing to prevent sliding friction between said cable and means.

3. In combination, a housing for a flexible cable, a flexible cable reciprocable therein, terminal members receiving the ends of said housing, means within said housing and having anti-friction engagement with said housing and cable, said means being of less length than the length of said housing to prevent sliding friction between said cable and means, said means comprising a plurality of spaced ball carriers, yielding means therebetween whereby the cable is maintained in the neutral axis of the housing.

4. In combination, a flexible housing, a flexible element or cable, means to position said cable in the neutral axis of said housing and to provide anti-friction relative longitudinal movements between the cable and housing, said means comprising a plurality of ball carriers and means connecting and spacing said carriers constructed to yield to accommodate relative longitudinal movements of the carriers and changed angular relation between the planes of the carriers together with fixedly positioned terminal members, said members slidably receiving the end portions of said rods, and rocking members within said terminal elements having plane surfaces to engage the extremities of said rods.

5. A flexible housing, a flexible cable therein, said housing comprising a plurality of rods, said rods arranged in circular formation, each rod slidably engaging adjacent rods, fixed terminal members, rocking members therein having plane surfaces engaging the ends of said rods, and anti-friction means between said housing and cable adapted to hold said cable in the neutral axis of said housing.

LOUIS C. HUCK.